United States Patent
DeKeuster et al.

(10) Patent No.: US 10,033,022 B2
(45) Date of Patent: Jul. 24, 2018

(54) BATTERY MODULE RETENTION STRUCTURE

(71) Applicant: Johnson Controls Technology Company, Holland, MI (US)

(72) Inventors: Richard M. DeKeuster, Racine, WI (US); Robert J. Mack, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 872 days.

(21) Appl. No.: 14/501,871

(22) Filed: Sep. 30, 2014

(65) Prior Publication Data

US 2016/0093856 A1    Mar. 31, 2016

(51) Int. Cl.
| | | |
|---|---|---|
| *H01M 6/42* | (2006.01) | |
| *H01M 2/10* | (2006.01) | |
| *B60K 1/04* | (2006.01) | |

(52) U.S. Cl.
CPC ............. *H01M 2/1083* (2013.01); *B60K 1/04* (2013.01); *H01M 2/10* (2013.01); *B60K 2001/0411* (2013.01); *B60Y 2200/92* (2013.01); *B60Y 2306/01* (2013.01); *H01M 2220/20* (2013.01); *Y02T 90/124* (2013.01)

(58) Field of Classification Search
CPC .. H01M 2/1083; H01M 2/10; H01M 2220/20; B60K 1/04; B60K 2001/0411; B60Y 2200/92
See application file for complete search history.

(56) References Cited

U.S. PATENT DOCUMENTS

| | | | |
|---|---|---|---|
| 4,943,498 | A | 7/1990 | Cooper et al. |
| 5,689,171 | A | 11/1997 | Ludewig |
| 6,161,810 | A | 12/2000 | Crow et al. |
| 6,224,998 | B1 | 5/2001 | Brouns et al. |
| 6,547,020 | B2 | 4/2003 | Maus et al. |
| 6,555,264 | B1 | 4/2003 | Hamada et al. |
| 6,866,544 | B1 | 3/2005 | Casey et al. |
| 7,320,843 | B2 | 1/2008 | Harrington |
| 7,333,324 | B2 | 2/2008 | DeLuga |
| 7,507,041 | B2 | 3/2009 | Ueda et al. |
| 7,658,636 | B2 | 2/2010 | Takeuchi et al. |
| 7,780,009 | B2 | 8/2010 | Casanova |
| 8,091,669 | B2 | 1/2012 | Taneda et al. |
| 8,110,300 | B2 | 2/2012 | Niedzwiecki et al. |

(Continued)

FOREIGN PATENT DOCUMENTS

| | | | |
|---|---|---|---|
| DE | 202009015277 | 4/2010 | |
| JP | 2008-234870 | * 10/2008 | ............. H01M 2/10 |
| KR | 20070093222 A | 9/2007 | |

OTHER PUBLICATIONS

PCT/US2015/036980 International Search Report and Written Opinion dated Nov. 27, 2015.

*Primary Examiner* — Raymond Alejandro
(74) *Attorney, Agent, or Firm* — Fletcher Yoder, P.C.

(57) ABSTRACT

A battery module mounting system includes a housing of the battery module configured to receive a plurality of electrochemical cells, a lid coupled to a side of the housing, and a cage configured to secure the housing to a vehicle. Additionally, the cage includes a coupling mechanism configured to engage with the lid in a tongue and groove configuration to block movement of the housing in at least three directions when engaged.

24 Claims, 8 Drawing Sheets

(56) References Cited

U.S. PATENT DOCUMENTS

| | | |
|---|---|---|
| 8,302,716 B2 | 11/2012 | Yoda |
| 8,591,242 B2 | 11/2013 | Heinzen et al. |
| 8,703,316 B2 | 4/2014 | Motohashi |
| 2006/0216580 A1 | 9/2006 | Schlosser |
| 2006/0270273 A1 | 11/2006 | Goetz et al. |
| 2013/0062098 A1* | 3/2013 | Ikeda .................... H01M 2/305 |
| | | 174/138 F |
| 2013/0140099 A1 | 6/2013 | Ojima et al. |
| 2014/0342591 A1* | 11/2014 | Kim .................... B60L 11/1818 |
| | | 439/159 |

* cited by examiner

BATTERY MODULE RETENTION STRUCTURE

BACKGROUND

The present disclosure relates generally to the field of batteries and battery modules. More specifically, embodiments of the present disclosure relate to a retention structure for Lithium-ion (Li-ion) battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems.

The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator.

Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator.

In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, asis the case of certain types of EVs or PEVs.

As technology continues to evolve, there is a need to provide improved power sources, particularly battery modules, for such vehicles. For example, battery modules may be subject to external forces (e.g., uneven terrain, terrain inclines, car accidents) during normal operation. In certain configurations, the battery module may shift due to the external forces, potentially leading to damage of the internal components and/or features electrically coupling the battery module to the vehicle. As such, a system and method for securing the battery module within the vehicle is desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module mounting system including a housing of the battery module configured to receive a plurality of electrochemical cells, a lid coupled to a side of the housing, and a cage configured to secure the housing to a vehicle. Additionally, the cage includes a coupling mechanism configured to engage with the lid in a tongue and groove configuration to block movement of the housing in at least three directions when engaged.

The present disclosure also relates to a battery module disposed within a cage coupled to a vehicle. The battery module includes a housing configured to receive an electrochemical cell and a lid disposed on a side of the housing configured to engage a coupling mechanism of the cage in a tongue and groove configuration. Furthermore, a tongue has a first geometry and a groove has a second geometry corresponding to the first geometry such that the coupling mechanism is configured to block movement of the housing in at least three direction while engaging the lid. Moreover, the cage includes a leg and a support member. Also, the support member is hingedly coupled with the leg such that the support member is configured to rotate about a hinge to position the coupling mechanism into engagement with the lid.

The present disclosure further relates to a battery module including a housing configured to receive a plurality of lithium-ion electrochemical cells, a lid coupled to a top of the housing, and a retention feature positioned on a top surface of the lid and configured to receive a mating feature with a corresponding geometry. Moreover, a geometry of the retention feature is such that engagement between the retention feature and the mating feature resists movement in at least three directions.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
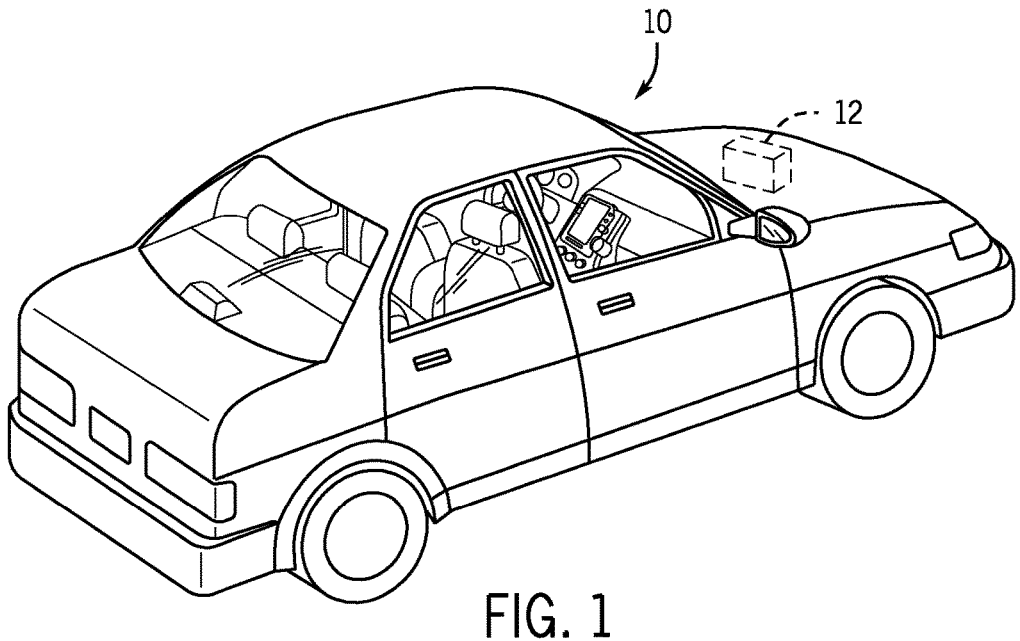
FIG. 1 is a perspective view of a vehicle having a battery module configured in accordance with present embodiments to provide power for various components of the vehicle.

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Based on the advantages over traditional gas-power vehicles, manufactures that generally produce traditional gas-powered vehicles may desire to utilize improved vehicle technologies (e.g., regenerative braking technology) within their vehicle lines. Often, these manufactures may utilize one of their traditional vehicle platforms as a starting point. Accordingly, since traditional gas-powered vehicles are designed to utilize 12 volt battery systems, a 12 volt lithium ion battery may be used to supplement a 12 volt lead-acid battery. More specifically, the 12 volt lithium ion battery may be used to more efficiently capture electrical energy generated during regenerative braking and subsequently supply electrical energy to power the vehicle's electrical system. Additionally, in a mHEV, the internal combustion engine may be disabled when the vehicle is idle. Accordingly, the 12 volt lithium ion battery may be used to crank (e.g., restart) the internal combustion engine when propulsion is desired.

However, as advancements are made in vehicle technologies, high voltage electrical devices may be included in the vehicle's electrical system. For example, the lithium ion battery may supply electrical energy to an electric motor in a FHEV. Often, these high voltage electrical devices utilize voltages greater than 12 volts, for example, up to 48, 96, or 130 volts. Accordingly, in some embodiments, the output voltage of a 12 volt lithium ion battery may be boosted using a DC-DC converter to supply power to the high voltage devices. Additionally or alternatively, a 48 volt lithium ion battery may be used to supplement a 12 volt lead-acid battery. More specifically, the 48 volt lithium ion battery may be used to more efficiently capture electrical energy generated during regenerative braking and subsequently supply electrical energy to power the high voltage devices.

Thus, the design choice regarding whether to utilize a 12 volt lithium ion battery or a 48 volt lithium ion battery may depend directly on the electrical devices included in a particular vehicle. Although the voltage characteristics may differ, the operational principles of a 12 volt lithium ion battery and a 48 volt lithium ion battery are generally similar. More specifically, as described above, both may be used to capture electrical energy during regenerative braking and subsequently supply electrical power to electrical devices in the vehicle. Additionally, as both operate over a period of time, the operational parameters may change. For example, the temperature of the lithium ion battery may increase the longer the lithium ion battery is in operation.

Accordingly, to simplify the following discussion, the present techniques will be described in relation to a battery system with a 12 volt lithium ion battery and a 12 volt lead-acid battery. However, one of ordinary skill in art should be able to adapt the present techniques to other battery systems, such as a battery system with a 48 volt lithium ion battery and a 12 volt lead-acid battery.

Battery modules in accordance with the present disclosure may be mounted to the frame of a vehicle. For example, the trunk may include an indentation to accommodate the battery module. Furthermore, a cage may surround the battery module, while installed, to provide additional protection from external forces, such as forces associated with travel along uneven terrain or unintentional impingements. It may be desirable to secure the battery module to the vehicle, for example, to reduce wear on the electronic components coupled to the battery module and to provide structural support to the battery module.

Accordingly, it is now recognized that the battery module housing may include a retention structure configured to secure the battery module to the vehicle frame, a cage that provides structural reinforcement, or a combination thereof. For example, the lid may include retention features (e.g., recesses or protrusions) that align with mating features of the cage and/or frame to secure the battery module to the vehicle. Moreover, the retention features may assist an operator during installation because the retention features may align with the mating features such that installation in an orientation other than an installation orientation is blocked. Further, the housing may include multiple retention features to enable a secure and robust connection to the vehicle.

With the foregoing in mind, present embodiments relate to retention structures and associated components applied to any battery or battery system, in particular battery systems employed in an xEV. For example, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
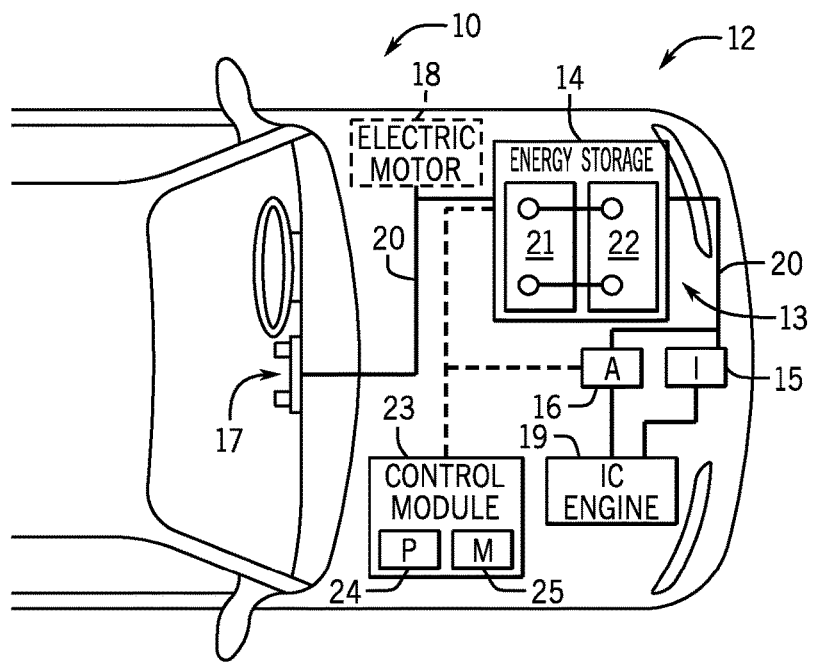
FIG. 2 is a schematic view of the vehicle depicted in FIG. 1 a battery system in the vehicle, in accordance with an embodiment of the present approach.

A more detailed view of the battery system 12 is described in FIG. 2. As depicted, the battery system 12 includes an energy storage component 14 coupled to an ignition system 15, an alternator 16, a vehicle console 27, and optionally to an electric motor 18. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 17 and the ignition system 15, which may be used to start (e.g., crank) the internal combustion engine 19.

Additionally, the energy storage component 14 may capture electrical energy generated by the alternator 16 and/or the electric motor 18. In some embodiments, the alternator 16 may generate electrical energy while the internal combustion engine 19 is running. More specifically, the alternator 16 may convert the mechanical energy produced by the rotation of the internal combustion engine 19 into electrical energy. Additionally or alternatively, when the vehicle 10 includes an electric motor 18, the electric motor 18 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 16 and/or the electric motor 18 during regenerative braking. As such, the alternator 16 and/or the electric motor 18 are generally referred to herein as a regenerative braking system.

To facilitate capturing and supplying electric energy, the energy storage component 14 may be electrically coupled to the vehicle's electric system via a bus 20. For example, the bus 20 may enable the energy storage component 14 to receive electrical energy generated by the alternator 16 and/or the electric motor 18. Additionally, the bus 20 may enable the energy storage component 14 to output electrical energy to the ignition system 15 and/or the vehicle console 17. Accordingly, when a 12 volt battery system 12 is used, the bus 20 may carry electrical power typically between 8-18 volts.

Additionally, as depicted, the energy storage component 14 may include multiple battery modules 13. For example, in the depicted embodiment, the energy storage component 14 includes a lithium ion (e.g., a first) battery module 21 and a lead-acid (e.g., a second) battery module 22, which each includes one or more battery cells. In other embodiments, the energy storage component 14 may include any number of battery modules 13. Additionally, although the lithium ion battery module 21 and lead-acid battery module 22 are depicted adjacent to one another, they may be positioned in different areas around the vehicle. For example, the lead-acid battery module 22 may be positioned in or about the interior of the vehicle 10 while the lithium ion battery module 21 may be positioned under the hood of the vehicle 10.

In some embodiments, the energy storage component 14 may include multiple battery modules to utilize multiple different battery chemistries. For example, when the lithium ion battery module 21 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 23. More specifically, the control module 23 may control operations of components in the battery system 12, such as relays (e.g., switches) within energy storage component 14, the alternator 16, and/or the electric motor 18. For example, the control module 23 may regulate amount of electrical energy captured/supplied by each battery module 21 or 22 (e.g., to de-rate and re-rate the battery system 12), perform load balancing between the battery modules 21 and 22, determine a state of charge of each battery module 21 or 22, determine temperature of each battery module 21 or 22, control voltage output by the alternator 16 and/or the electric motor 18, and the like.

Accordingly, the control module (e.g., unit) 23 may include one or processor 24 and one or more memory 25. More specifically, the one or more processor 24 may include one or more application specific integrated circuits (ASICs), one or more field programmable gate arrays (FPGAs), one or more general purpose processors, or any combination thereof. Additionally, the one or more memory 25 may include volatile memory, such as random access memory (RAM), and/or non-volatile memory, such as read-only memory (ROM), optical drives, hard disc drives, or solid-state drives. In some embodiments, the control unit 23 may include portions of a vehicle control unit (VCU) and/or a separate battery control module.

Furthermore, as depicted, the lithium ion battery module 21 and the lead-acid battery module 22 are connected in parallel across their terminals. In other words, the lithium ion battery module 21 and the lead-acid battery module 22 may be coupled in parallel to the vehicle's electrical system via the bus 20.

Figure 3:
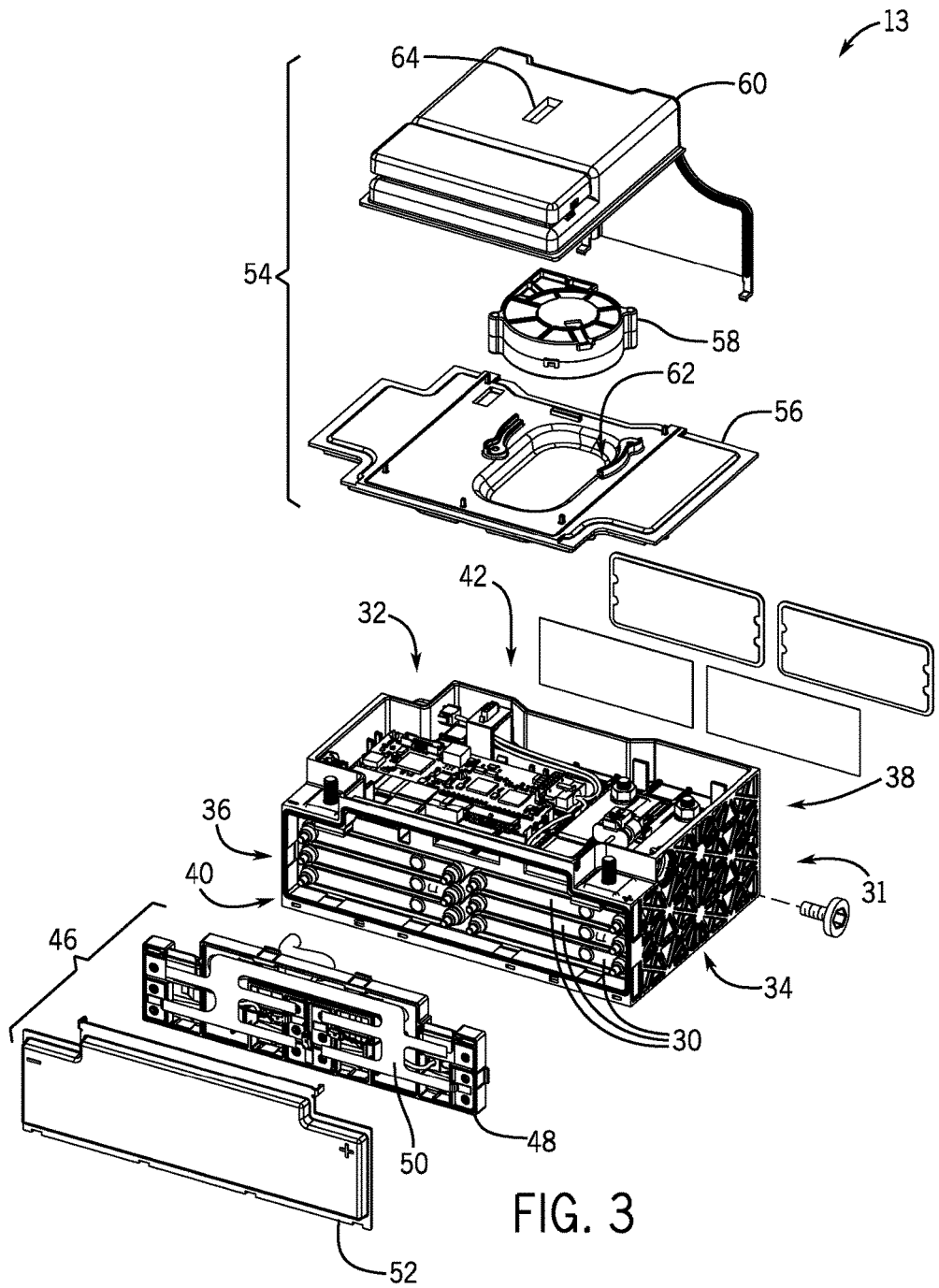
FIG. 3 is a partially exploded perspective view of an embodiment of a battery module for use in the vehicle of FIG. 1, the battery module having retention features configured to facilitate coupling the battery module to the vehicle.

A partially exploded perspective view of one example battery module 13 in accordance with the present disclosure is shown in FIG. 3. In the illustrated embodiment, the battery module 13 includes a number of individual electrochemical cells 30 (e.g., Li-ion electrochemical cells, battery cells, cells) housed in a housing 31 of the battery module 13. The battery system 12 may include one or more battery modules 13. In certain embodiments, the electrochemical cells 30 are prismatic cells arranged in a stacked configuration. However, in other embodiments, the electrochemical cells 30 may be cylindrical, oblong, or the like according to the energy density and size constrains for the battery module 13. The housing 31 includes a top side 32 (e.g., top wall), a bottom side 34 (e.g., bottom wall), and two reinforcing sides 36, 38 (e.g., reinforcing walls). The housing 31 also includes a front side 40 (e.g., front wall) and a back side 42 (e.g., back wall). It should be noted that the top side 32, the bottom side 34, the two reinforcing sides 36, 38, the front side 40, and the back side 42 (or walls) may be, depending on the embodiment, disposed in any orientation with respect to the vehicle 10. These are used as relative terms for battery module geometry. Indeed, presently disclosed embodiments may be applicable to any battery module 13 having the same or different configuration and/or orientation described above and in detail below. One of ordinary skill in the art would recognize that the components and examples used to describe battery modules 13 in accordance with the present disclosure should not be construed to limit the present disclosure to those components and examples alone. Rather, the disclosed examples are merely intended to serve as non-limiting examples to facilitate discussion of the present disclosure.

The front side 40 of the housing 31, in the illustrated embodiment, is covered by a panel 46. In certain embodiments, the panel 46 includes a snap on e-carrier 48, which may be utilized, for example, to establish electrical connections between the electrochemical cells 30 and other electrical components of the module 13. In the illustrated embodiment, the e-carrier 48 includes an integrated bus bar 50 configured to electrically couple the electrochemical cells 30 in a predetermined arrangement to achieve a particular voltage, capacity, or the like. The front side 40 of the housing 31 may be further covered by a front cover 52, which may be coupled to the e-carrier 48, to one or more portions or components of the housing 31 itself, or a combination thereof. Further, a cover assembly 54 may fit over the top side 32 (e.g., top wall).

In accordance with the present disclosure, the cover assembly 54 includes an interior cover 56, a fan 58, and a lid 60. The interior cover 56 is configured to couple to the housing 31 and enclose certain electronics within the housing 31. In the illustrated embodiment, the fan 58 is mounted proximate to the interior cover 56 and is configured to direct cooling air through the battery module 13. For example, the fan 58 may direct air through a cooling channel 62 to provide thermal management (e.g., active cooling) of the electrochemical cells 30. However, in other embodiments, the fan 58 may be mounted on a side 36, 38 of the battery module 13, or not included in the battery module 13. For example, the electrochemical cells 30 may be passively cooled using various material properties and structural features of components of the housing 31. As depicted, the lid 60 includes a retention feature 64 configured to couple to a cage and/or the frame of the vehicle 10. In the illustrated embodiment, the retention feature 64 includes a groove recessed into the lid 60. However, in certain embodiments, the lid 60 may include a tongue protruding from the surface of the lid 60. Moreover, as mentioned above, in certain embodiments the housing 31 and/or the panel 46 may also include retention features 64 to facilitate securing the battery module 13 to the vehicle 10. In other words, such retention features 64 may be positioned on any one or a combination of outer structural components of the battery module 13. However, positioning the retention feature 64 on the lid 60 or an upper surface facilitates engagement of the battery module 13 from overhead and allows for elimination of traditional footings that are used for battery retention in vehicles and the like.

Figure 4:
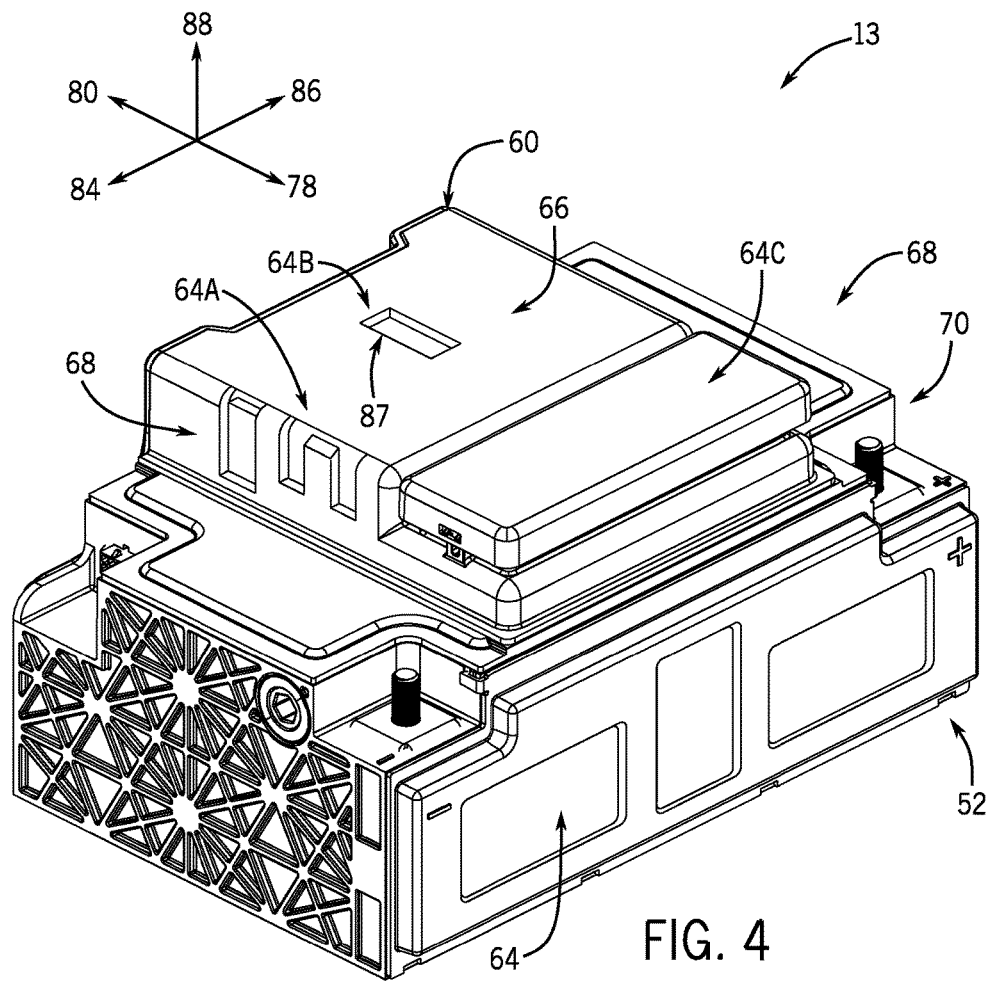
FIG. 4 is a perspective view of the battery module of FIG. 3, the battery module having retention features incorporated into the lid and housing, in accordance with an aspect of the present disclosure.

Keeping in mind that the retention features may generally be positioned at different regions of the battery module 13, FIG. 4 is a perspective view of the battery module 13 having retention features 64 incorporated into the lid 60. A mating feature may include a corresponding shape configured to engage one or more of the retention features 64. As an example, a first retention feature 64A is projecting from a surface 66 of the lid 60. More particularly, in the illustrated embodiment, the first retention feature 64A is disposed along a first edge 68 and includes a protrusion surrounded by a recessed portion. In certain embodiments, the retention feature 64 may be recessed into the surface 66 and configured to receive a corresponding mating part (e.g., coupled to a cage or the frame). For example, a second retention feature 64B is a recess in the lid 60. As yet another example, a third retention feature 64C proximate a second edge 70 includes recesses or structural features configured to receive corresponding mating features. In certain embodiments, the third retention feature 64C may also function as a structural aspect of a vent for the fan 58. As will be described below, the retention features 64 may be configured to cooperate with one or more mating features to substantially block movement of the battery module 13 along a first direction 78, a second direction 80, a third direction 84, a fourth direction 86, and a fifth direction 88. Accordingly, the battery module 13 may be constrained from movement while coupled to the vehicle 10 in, for example, at least three dimensions.

To provide additional stability to the battery module 13 while in the vehicle 10, the retention features 64 may also include shock absorbers 87. For example, the shock absorbers 87 may be elastomers, springs, foam layers/pads, or any material configured to compress and/or deform when acted upon by an external force. By incorporating the shock absorbers 87, the battery module 13 may be cushioned from sudden external forces. In this regard, the type, number, and positioning of the shock absorbers 87 may be selected based on the particular dimensions and other structural features of the module 13, as well as the manner in which the battery module 13 couples with the vehicle 10. For example, the shock absorbers 87 may deform to absorb a portion of the external energy. Moreover, the shock absorbers 87 may provide a barrier between the retention features 64 and the mating features to extend the working life of the surfaces. For example, the shock absorbers 87 may decrease direct contact between the retention features 64 and the mating features, thereby reducing wear on the components. Further, the shock absorbers 87 may provide more consistent contact by avoiding gaps, which might be present between two rigid surfaces interacting. While the illustrated embodiment depicts the shock absorber 87 disposed within the retention features 64, in other embodiments the shock absorber 87 may be coupled to corresponding mating features configured to engage the retention features 64.

Figure 5:
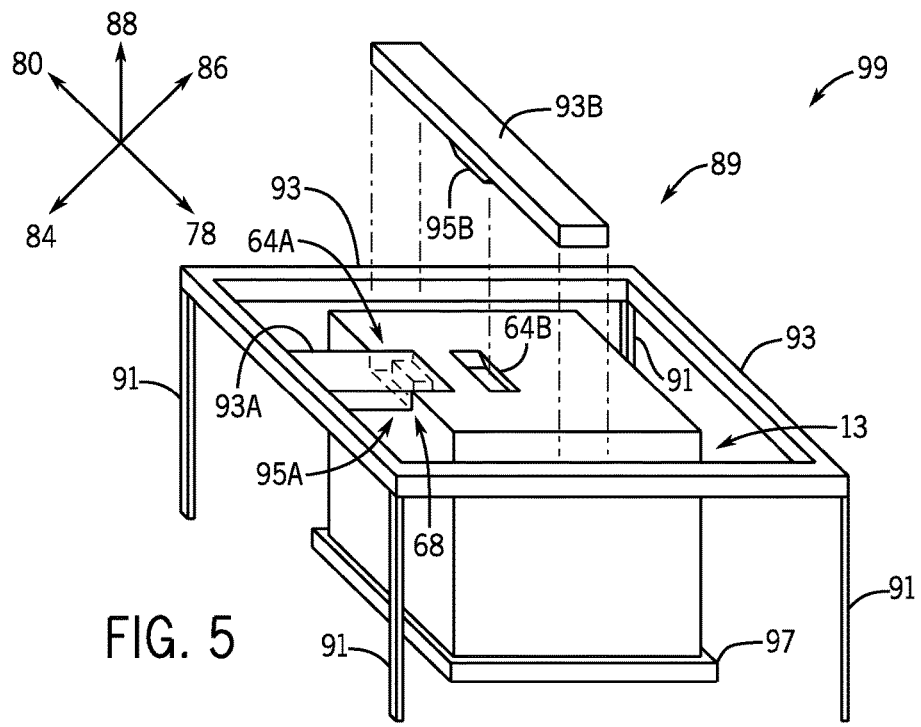
FIG. 5 is a schematic perspective view of the battery module of FIG. 3 disposed within a cage, the cage having mating features configured to engage the retention features of the battery module, in accordance with an aspect of the present disclosure.

As mentioned above, the battery module 13 may be disposed within a cage 89 to secure the battery module 13 to the vehicle 10, an example of which is shown in FIG. 5. As illustrated, the cage 89 is generally rectangular and surrounds the battery module 13. However, the cage 89 may be any appropriate shape and size enabling the battery module 13 to be retained therein. Furthermore, in certain embodiments, the cage 89 may be coupled to the vehicle 10 (e.g., to a frame component of the vehicle).

In certain embodiments, legs 91 may be coupled to support members 93 to provide a rigid and structurally secure cage 89. In certain embodiments, the cage 89 is welded together. However, in other embodiments, the legs 91 and the support members 93 may be bolted, hinged, or otherwise coupled together. As shown, a coupling mechanism 95 (also referred to as a mating feature) extends from the cage 89 (e.g., from support members 93) to engage the retention features 64 of the battery module 13. In the illustrated embodiment, the coupling mechanism 95 is a tongue protruding from the support member 93. However, in other embodiments, the support members 93 and/or legs 91 may include grooves configured to receive protrusions or tongues of the lid 60. As such, the coupling mechanism 95 may be configured to engage the lid 60 in a tongue and groove configuration to secure the lid 60 to the cage 89. Accordingly, the battery module 13 may be secured within the cage 89 with movement in at least three directions blocked by the engagement of the mating features 95 with the retention features 64.

To facilitate insertion of the battery module 13 into the cage 89, the cage 89 may also include a tray 97 configured to receive the battery module 13. For example, the tray 97 may include a generally flat base (e.g., relative to a horizontal plane approximately parallel to a ground plane) and raised edges. The tray 97 may be configured to provide a substantially level surface for the battery module 13. However, in other embodiments, the tray 97 may be incorporated into the vehicle frame. In certain embodiments, the battery module 13 does not include footings. As a result, the internal spacing of the battery module 13 may be increased. Accordingly, the tray 97 may facilitate alignment of the battery module 13 within the cage 89 and also provide some structural support to the battery module 13. However, in other embodiments, the tray 97 may not be present. As a result, the battery module 13 may be aligned within the cage 89 using the mating features 95. Moreover, the vehicle frame may provide sufficient support for the vehicle, without the tray 97 or footings. However, the present disclosure is also intended to encompass embodiments where the bottom side 34 includes one or more retention features 64 (e.g., protrusions and/or gaps) to enable securement to the cage 89 or another vehicle feature (e.g., a protrusion extending from the vehicle frame). As a result, the cage 89 is configured to substantially secure the battery module 13 to the vehicle 10.

In the illustrated embodiment of FIG. 5, a partially exploded view of the battery module 13 is provided showing the battery module 13 arranged in an installation orientation 99. In the installation orientation, the retention features 64 of the battery module 13 are engaged with the mating features 95 of the cage 89. For example, a first mating feature 95A of a first support member 93A extending toward the first edge 68 of the battery module 13 is coupled to the first retention feature 64A. By coupling the first mating feature 95A to the first retention feature 64A proximate the first edge 68, movement of the battery module 13 may be blocked in at least three directions (e.g., the first direction 78, the second direction 80, and the fifth direction 88). Furthermore, a second support member 93B is shown in an expanded view as engaging the second retention feature 64B arranged on the lid 60 with a second mating feature 95B. Accordingly, because of the positioning of the retention features 64, attempts to place the battery module 13 in an orientation other than the installation orientation 99 would be blocked by the mating features 95. For instance, the battery module 13 would create an interference with the first mating feature 95A extending toward the first edge 68 of the battery module 13 if the first retention feature 64A was not aligned with the first mating feature 95A. As a result, an operator installing the battery module 13 in the vehicle 10, may receive immediate feedback indicating whether the installation is appropriate.

Figure 6:
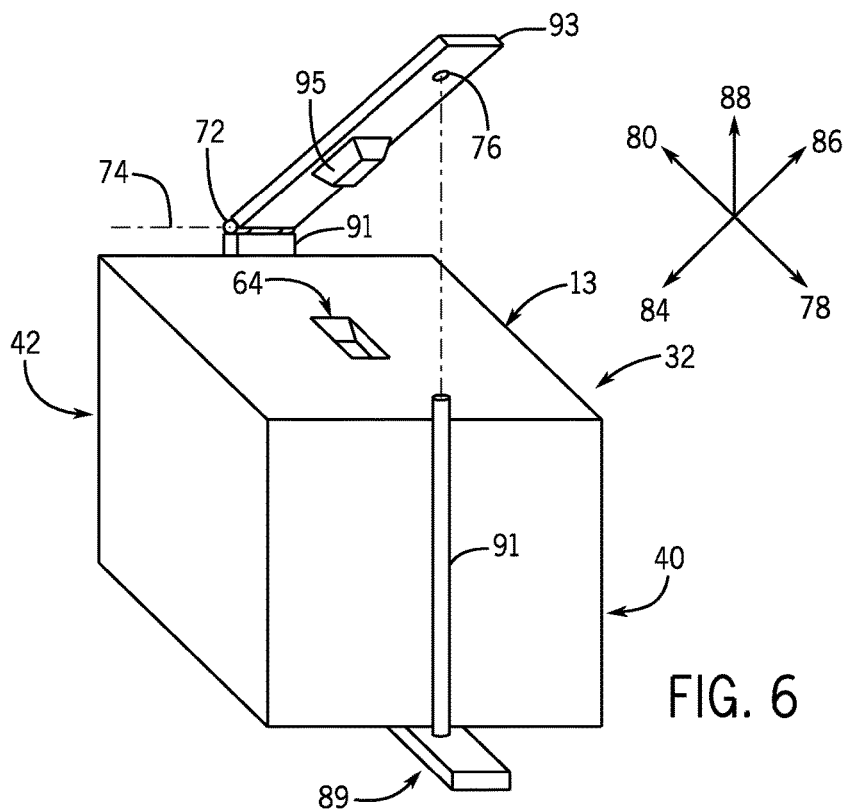
FIG. 6 is a schematic perspective view of a further embodiment of the battery module of FIG. 3 disposed within a cage, the cage having mating features configured to engage the retention features of the battery module, in accordance with an aspect of the present disclosure.

FIG. 6 is a perspective view of a further embodiment of the battery module 13 disposed within the cage 89. In the illustrated embodiment, the cage 89 does not extend completely around the battery module 13. Instead, the cage 89 includes the legs 91 positioned at the front side 40 and the back side 42 of the battery module 13, and a support member 93 configured to be disposed along the top side 32. As shown, the support member 93 is coupled to the leg 91 along the back side 42 via a hinge 72 and is configured to rotate about a hinge axis 74. Rotation about the hinge axis 74 is configured to move the mating feature 95 into engagement with the retention feature 64. Furthermore, rotation about the hinge axis 74 may couple the support member 93 to the leg 91 along the front side 40 via a hole 76. By engaging the leg 91 with the hole 76, the mating feature 95 may engage the retention feature 64 and block movement of the battery module 13 in at least three directions (e.g., the first direction 78, the second direction 80, and the fifth direction 88). In certain embodiments, the support member 93 may be coupled to the frame of the vehicle 10. For example, the hinge 72 may be mounted to a frame member of the vehicle 10, thereby coupling the battery module 13 to the frame while the mating feature 95 engages the retention feature 64. Indeed, aspects of a vehicle frame may function as cage components.

Figure 7:
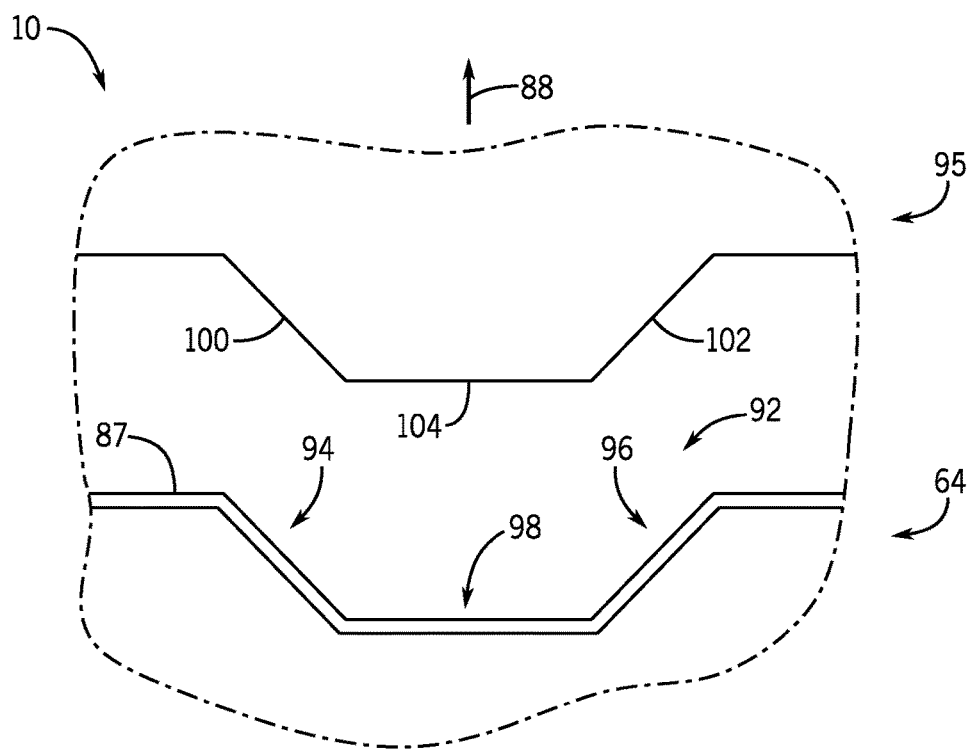
FIG. 7 is a cross-sectional side view of a retention feature aligned with a mating feature, in accordance with an aspect of the present disclosure.

FIG. 7 is a cross-sectional side view of the mating feature 95 engaged with the retention feature 64 of the battery module 13 to produce a retained assembly. As shown, the retention feature 64 includes a recessed portion 92 having a first sloped edge 94, a second sloped edge 96, and a bottom face 98. Moreover, the mating feature 95 is configured to substantially align with the recessed portion 92 (e.g., the mating geometry of the mating feature 95 corresponds to the retention feature 64). In other words, the mating feature 95 and the retention feature 64 have corresponding or complementary geometries. That is, a first edge 100 of the mating feature 95 is configured to align with the first sloped edge 94, a second edge 102 is configured to align with the second sloped edge 96, and a third edge 104 is configured to align with the bottom face 98. Together, the first, second, and third edges 100, 102, 104 form a protrusion that is shaped and sized to fit within the recessed portion 92. In other words, the recessed portion 92 and the protrusion have corresponding mating geometries. As a result, the mating feature 95 engages the battery module 13 to lock and/or secure the battery module 13 to the cage 89. To that end, movement of the battery module 13 is restricted because of the contact between the mating feature 95 and the retention feature 64. For example, movement in the fifth direction 88 is blocked because the third edge 104 applies a force against the bottom face 98 in a direction opposite the fifth direction 88.

Moreover, as will be described below, the general shape of the recessed portion 92 may be particularly selected based on design conditions. For example, the recessed portion 92 may be a cylindrical hole that receives a pin protrusion from the cage 89. While the illustrated embodiment of FIG. 6 shows the battery module 13 having the recessed portion 92, in other embodiments the cage 89 may include a recessed portion configured to receive a protrusion of the battery module 13. For example, the housing 31 may have protrusions that clip into locking members incorporated into the cage 89.

Figure 8:
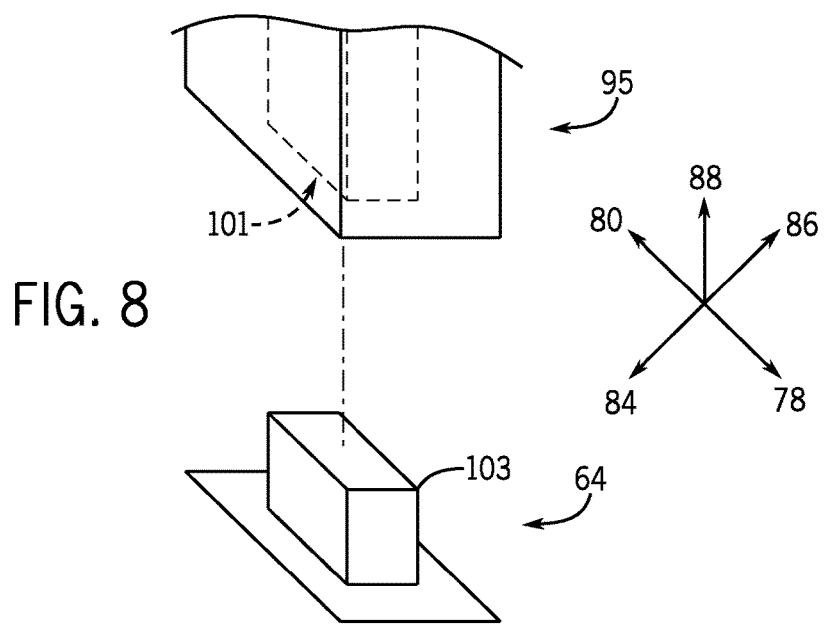
FIG. 8 is a schematic perspective view of a further embodiment of a retention feature aligned with a mating feature, in accordance with an aspect of the present disclosure.

Indeed, FIG. 8 is a perspective view of another embodiment of the mating feature 95 aligned with the retention feature 64, wherein the mating feature 95 includes an opening 101 and the retention feature 64 includes a protrusion 103. The opening 101 is configured to receive the protrusion 103 extending from the retention feature 64 and secure the retention feature 64 to the mating feature 95. While the illustrated embodiment shows the opening 101 and the protrusion 103 as generally rectangular shapes, in other embodiments the opening 101 and the protrusion 103 may be cylindrical, triangular, polygonal, curved, or any other suitable configuration to enable engagement of the retention feature 64 by the mating feature 95. Engagement of the retention feature 64 via the mating feature 95 blocks movement of the battery module 13 in, for example, at least three directions. For example, in the illustrated embodiment, when the protrusion 103 is confined within the opening 101, movement in the first direction 78, second direction 80, third direction 84, fourth direction 86, and fifth direction 88 is blocked.

Figure 9:
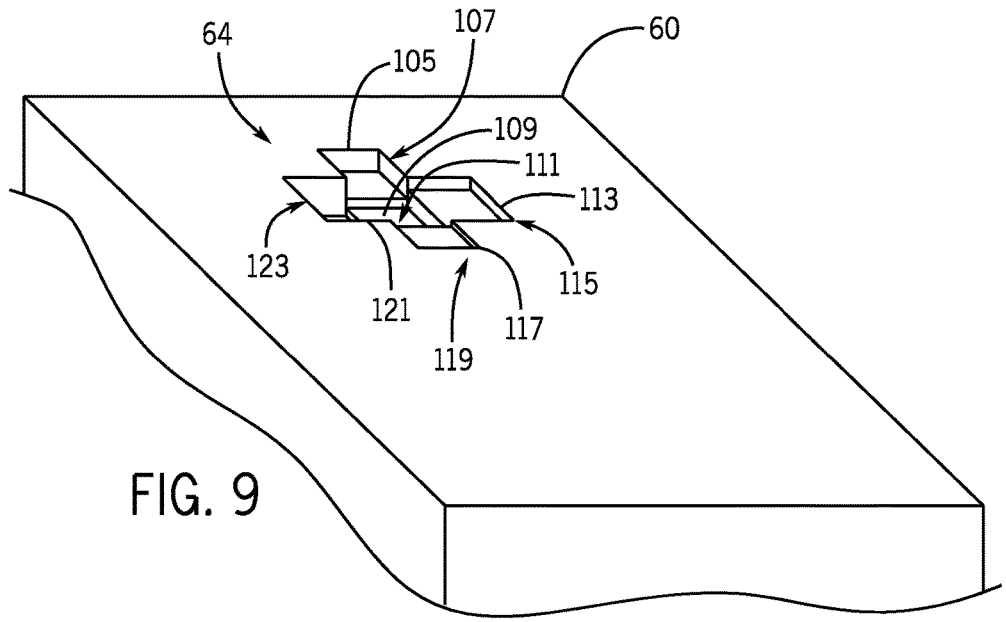
FIG. 9 is a perspective view of an embodiment of a retention feature disposed in the lid of the battery module of FIG. 3.

FIG. 9 is a perspective view of a further embodiment of the retention feature 64. In the illustrated embodiment, the retention feature 64 includes recessed portions 92 arranged together to form a plus sign. A first recessed portion 105 has a first depth 107. As used herein, depth refers to an extension into the lid 60 in a direction opposite the fifth direction 88. The first recessed portion 105 is adjacent to a second recessed portion 109 having a second depth 111. As shown in the illustrated embodiment, the second depth 111 is greater than the first depth 107. Moreover, the second recessed portion 109 is adjacent to a third recessed portion 113 having a third depth 115, a fourth recessed portion 117 having a fourth depth 119, and a fifth recessed portion 121 having a fifth depth 123. The first, second, third, fourth, and fifth depths 107, 111, 115, 119, 123 may all be different. For example, as shown in the illustrated embodiment, the second depth 111 is greater than the first depth 107, the third depth 115, and the fourth depth 119. As described above, varying the depths 107, 111, 115 119, and 123 may block the battery module 13 from being installed in an improper orientation. For example, the mating feature 95 may have corresponding protrusions to engage the first, second, third, fourth, and fifth recessed portions 105, 109, 113, 117, 121. Interferences between the mating feature 95 and the retention feature 64 may provide an indication to the operator that the battery module 13 is in an improper orientation. Moreover, proper alignment may block movement of the battery module 13 in at least three directions.

Figure 10:
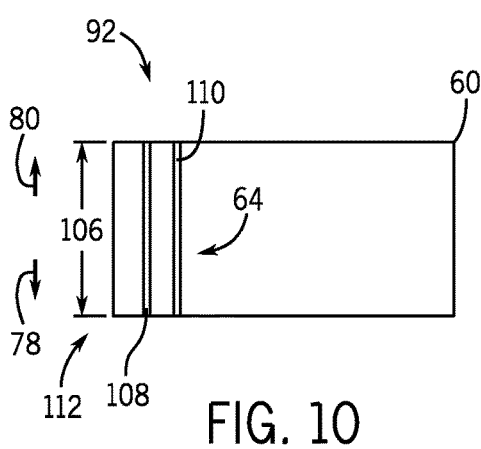
FIG. 10 is a schematic top view of an embodiment of a lid of a battery module having a retention feature, in accordance with an aspect of the present disclosure.
Figure 11:
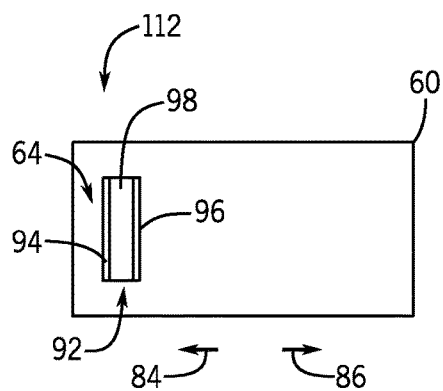
FIG. 11 is a schematic top view of a further embodiment of a lid of a battery module having a retention feature, in accordance with an aspect of the present disclosure.
Figure 12:
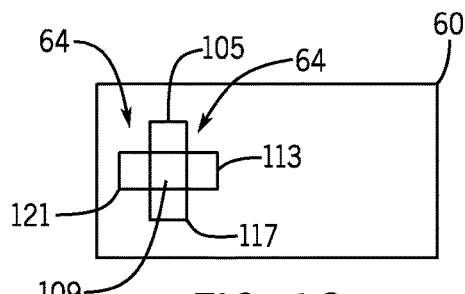
FIG. 12 is a schematic top view of another embodiment of a lid of a battery module having a retention feature, in accordance with an aspect of the present disclosure.

FIGS. 10-12 are top views of the lid 60 having different configurations of the retention feature 64. As shown in FIG. 10, the retention feature 64 extends substantially across a width 106 of the lid 60. The retention feature 64 includes a generally rectangular first segment 108 and a generally rectangular second segment 110 substantially parallel to the first segment 108. However, in other embodiments, the shape of the first and second segments 108, 110 may be any suitable shape. For example, both the first and second segments 108, 110 may be generally cylindrical, triangular, or the like. Moreover, in certain embodiments, the first segment 108 may be a different shape than the second segment 110. Because the retention feature 64 is disposed along a far end 112 of the lid 60 (e.g., closer to a first end of the lid 60 than a substantially opposite second end of the lid 60), the retention feature 64 is configured to enable proper placement and alignment (e.g., placement in the installation orientation 99) of the battery module 13 within the cage 89 and/or vehicle 10. For example, the cage 89 may include mating features 95 that are configured to engage the retention feature 64 while the battery module 13 is positioned in the installation orientation 99. Accordingly, placement in an improper orientation may be blocked by the retention features 64 or the mating features 95. To this end, attempts to position the battery module 13 in an improper alignment orientation would result in interference between the mating features 95 and the lid 60, thereby alerting the operator to reposition the battery module 13 in the installation orientation 99. It should be noted that, in the embodiment illustrated by FIG. 10, the battery module 13 may move in the first direction 78 and the second direction 80 because the first and second segments 108, 110 may be uniform and extend fully across the lid 60. As a result, the battery module 13 may be slid into and out of the vehicle 10.

In the embodiment illustrated in FIG. 11, a top view of the retention feature 64 of FIG. 6 is shown. As shown, the retention feature 64 includes the first sloped edge 94, the second sloped edge 96, and the bottom face 98. Furthermore, in the illustrated embodiment, the retention feature 64 is disposed on the far end 112 of the lid 60. As described above, disposing the retention feature 64 on the far end 112 enables proper alignment of the battery module 13 in the installation orientation 99. The first and second sloped edges 94, 96 are configured to block rotation of the battery module 13 in at least three direction when coupled to the mating feature 95 and are also configured to facilitate smooth engagement and alignment. For instance, movement in the third direction 84 is blocked by interference with the first sloped edge 94, while movement in the fourth direction 86 is blocked by interference with the second sloped edge 96. Furthermore, movement in the fifth direction 88 is blocked by interference with the third edge 104 of mating feature 95.

FIG. 12 is a top view of the retention feature 64 illustrated in FIG. 9. As shown, the plus shaped retention feature 64 includes first, second, third, fourth, and fifth recessed portions 105, 109, 113, 117, 121 arranged on the lid 60. Furthermore, as described above, the retention feature 64 includes respective first, second, third, fourth, and fifth depths 107, 111, 115, 119, 123 to provide an indication to the operator regarding the proper orientation of the battery module 13. Accordingly, movement of the battery module 13 may be blocked in at least three direction while the battery module 13 is coupled to the mating feature 95.

Figure 13:
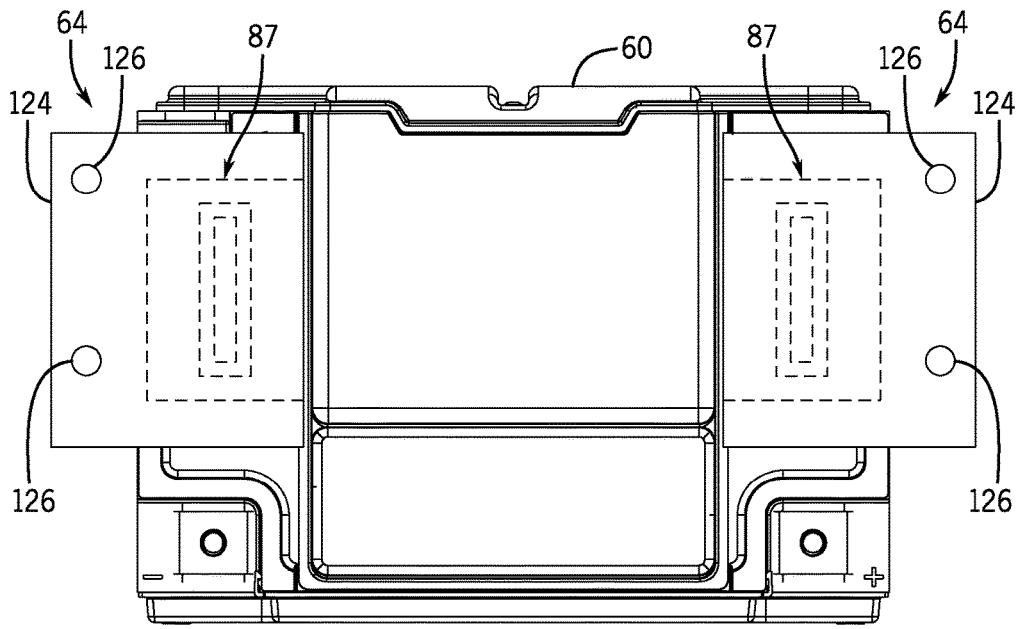
FIG. 13 is a top view of a further embodiment of a lid of a battery module having a retention feature, in accordance with an aspect of the present disclosure.

FIG. 13 is a top view of an embodiment including retention features 64 positioned within or on the lid 60 of the battery module 13 and being engaged by mating features 95, which extend from or recess into plates 124. The plates 124 include apertures 126 configured to couple the lid 60 to other features of the cage 89. For example, the plates 124 may be bolted to the cage via the apertures 126. However, in certain embodiments, other fasteners may be used to couple the lid 60 to the cage 89 via the apertures 126. Moreover, while the illustrated embodiment includes plates 124 coupled to the lid 60, in other embodiments the plates 124 may be arranged on the sides 36, 38, the front side 40, back side 42, and/or the bottom side 34. Furthermore, the plates 124 may include the shock absorbers 87. For example, the shock absorbers 87 may be coatings or layers of foam positioned on a bottom surface of the plates 124 and between or around the interface between the mating features 95 and the retention features 64. Accordingly, the plates 124 are configured to provide a rigid support for the mounting features 95 for the battery module 13 while avoiding abrasive interaction.

Figure 14:
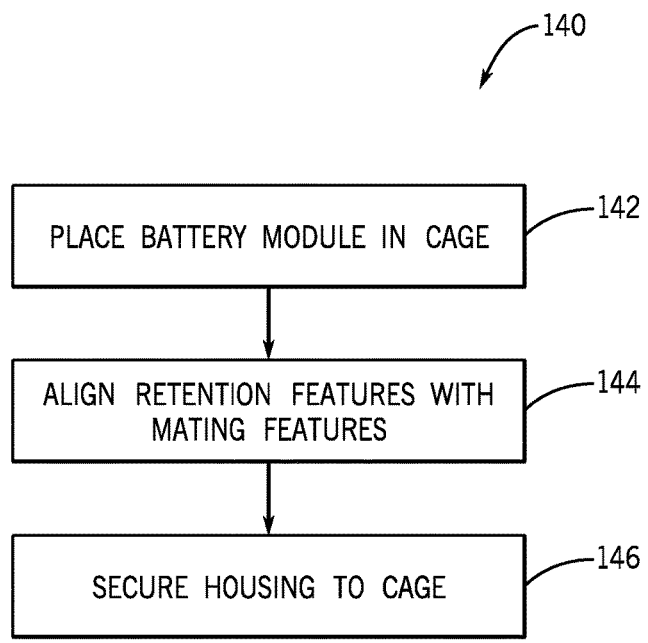
FIG. 14 is a flow chart of an embodiment of a method for installing the battery module of FIG. 4 in a cage.

It should be appreciated from the foregoing description that the various retention features 64 described herein may facilitate appropriate placement and retention of the battery module 13 within the vehicle 10 during installation and operation. As an example, FIG. 14 illustrates a flowchart of a method 140 for securing the battery module 13 within the vehicle 10. The battery module 13 is placed within the cage 89 at block 142. For example, the battery module 13 may be disposed within the cage 89. In certain embodiments, the top side 32, the bottom side 34, the sides 36, 38, or any combination thereof include retention features 64 that are configured to align with the cage 89. The retention features 64 are aligned with mating features 95 of the cage 89 at block 144. For instance, the recessed portion 92 of the housing 31 may be aligned with the mating feature 95 to secure the housing 31 to the cage 89. Moreover, in other embodiments, the apertures 126 of the plates 124 (FIG. 13) are aligned with corresponding apertures 126 of the cage 89. The housing 31 is secured within the cage at block 146. For example, the housing 31 may be lowered onto mating features 95 to secure the housing 31 to the cage 89.

Figure 15:
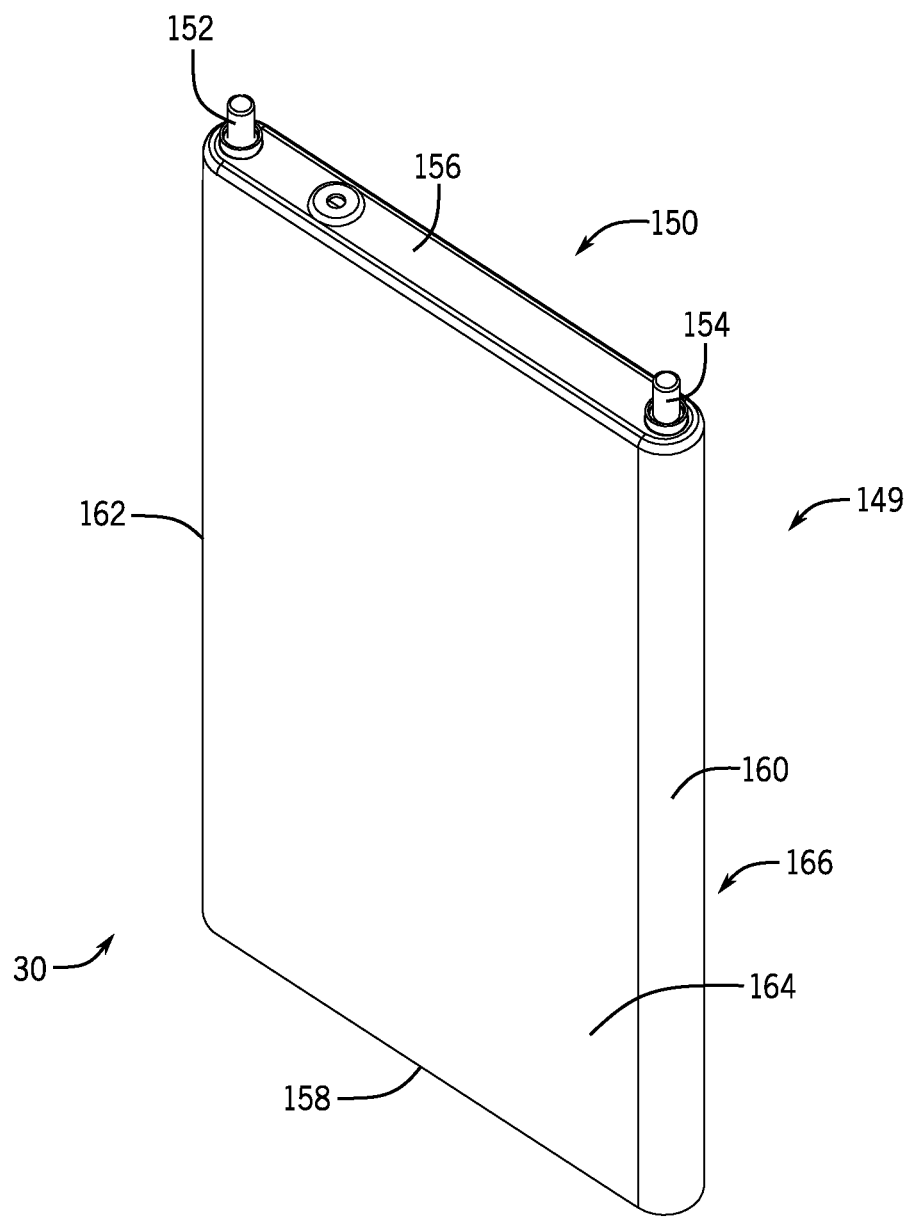
FIG. 15 is a perspective view of a prismatic battery cell used in the lithium ion battery, in accordance with an embodiment of the present approach.

The battery cells 30 described herein may be prismatic battery cells, where a prismatic battery cell, as defined herein, includes a prismatic case 149 that is generally rectangular in shape, as shown in FIG. 15. In contrast to pouch cells, the prismatic casing is formed from a relatively inflexible, hard (e.g., metallic) material. However, it should be noted that certain of the embodiments described below may incorporate pouch cells in addition to or in lieu of prismatic battery cells. In accordance with present embodiments, each prismatic battery cell may include a top casing portion 150, where a set of cell terminals 152, 154 (e.g., positive and negative cell terminals) are located. One or more cell vents 156 may also be located on the top casing portion 150. The prismatic cell casing 149 also includes a bottom casing portion 158 positioned opposite the top casing portion 150. First and second sides 160, 162, which may be straight or rounded, extend between the bottom and top casing portions 150, 158 in respective positions corresponding to the cell terminals 152, 154. First and second faces 164, 166, which may be flat (as shown) or rounded, couple the first and second sides 160, 162 at opposing ends of each cell 30.

One or more of the disclosed embodiments, alone or in combination, may provide one or more technical effects useful in the production, installation, and use of battery modules for multiple applications. For example, certain embodiments of the present approach may enable securement of the battery module within the vehicle, such as by coupling the battery module to the cage or the vehicle frame. In addition, certain embodiments of the present approach provide feedback to operators installing the battery module regarding the positioning and orientation of the battery module within the vehicle. Moreover, certain embodiments enable elimination of footings coupled to the battery module, thereby conserving space within the battery module. The technical effects and technical problems in the specification are examples and are not limiting. It should be noted that the embodiments described in the specification may have other technical effects and can solve other technical problems.

While only certain features and embodiments in accordance with the present disclosure have been illustrated and described, many modifications and changes may occur to those skilled in the art (e.g., variations in sizes, dimensions, structures, shapes and proportions of the various elements, values of parameters (e.g., temperatures, pressures), mounting arrangements, use of materials, colors, orientations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure.

Furthermore, in an effort to provide a concise description of the exemplary embodiments, all features of an actual implementation may not have been described (i.e., those unrelated to the presently contemplated best mode of carrying out the disclosure, or those unrelated to enabling the disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module mounting system, comprising:
   a housing of a battery module configured to receive a plurality of electrochemical cells;
   a lid coupled to a side of the housing;
   a cage configured to secure the housing to a vehicle; and
   a tray configured to facilitate insertion of the battery module into the cage, wherein the cage comprises a coupling mechanism configured to directly physically engage with the lid in a tongue and groove configuration to block movement of the housing in at least three directions when engaged, wherein the cage comprises a support member having the coupling mechanism, wherein the support member is configured to extend between a first side of the cage and a second side of the cage, wherein the battery module is disposed between the first side and the second side, wherein the support member is configured to couple the first side, the second side, and the lid, and wherein the tray is configured to couple the housing to a frame component of the vehicle.

2. The battery module mounting system of claim 1, wherein the lid comprises a groove and the coupling mechanism comprises a tongue with a mating geometry corresponding to the groove such that the tongue can be inserted into the groove.

3. The battery module mounting system of claim 2, wherein the groove includes sloped sides.

4. The battery module mounting system of claim 1, wherein the lid comprises a tongue and the coupling mechanism comprises a groove with a mating geometry corresponding to the tongue such that the tongue can be inserted into the groove.

5. The battery module mounting system of claim 1, wherein the coupling mechanism is configured to engage with the lid such that the battery module must be positioned in an installation orientation while the coupling mechanism is engaged with the lid.

6. The battery module mounting system of claim 1, wherein the coupling mechanism is configured to block installation of the battery module in the cage in a position other than an installation orientation.

7. The battery module mounting system of claim 1, wherein the cage comprises:
a leg positioned adjacent to the housing of the battery module; and
a hinge that couples the coupling mechanism to the leg such that the coupling mechanism can be rotated to extend laterally from the leg toward the housing.

8. The battery module mounting system of claim 1, comprising a groove formed in the lid, wherein the groove comprises a first recessed portion having a first depth and a second recessed portion having a second depth, wherein the first depth is less than the second depth.

9. The battery module mounting system of claim 1, wherein the lid comprises a plate configured to couple to the coupling mechanism of the cage via fasteners.

10. The battery module mounting system of claim 1, comprising a shock absorber disposed between the coupling mechanism and the lid while the coupling mechanism is engaged with the lid, wherein the shock absorber is configured to deform when an external force is placed on the shock absorber.

11. The battery module mounting system of claim 10, wherein the lid comprises a groove and the shock absorber is disposed within the groove.

12. The battery module mounting system of claim 1, wherein the housing does not include footings configured to couple the housing to the vehicle.

13. A battery system, comprising:
a battery module disposed within a cage coupled to a vehicle;
a tray of the cage configured to facilitate insertion of the battery module into the cage;
a housing of the battery module configured to receive an electrochemical cell; and
a lid of the battery module disposed on a side of the housing configured to directly physically engage a coupling mechanism of the cage in a tongue and groove configuration, wherein a tongue has a first geometry and a groove has a second geometry corresponding to the first geometry such that the coupling mechanism is configured to block movement of the housing in at least three directions while engaging the lid;
wherein the cage comprises a leg and a support member, wherein the support member is hingedly coupled with the leg such that the support member is configured to rotate about a hinge to position the coupling mechanism into engagement with the lid, wherein the leg and the support member are configured to provide structural support for the cage, wherein the support member is configured to extend between a first side of the cage and a second side of the cage, wherein the battery module is disposed between the first side and the second side, wherein the support member is configured to couple the first side, the second side, and the lid, and wherein the tray is configured to couple the housing to a frame component of the vehicle.

14. The battery module of claim 13, wherein the cage is configured to facilitate rotation of the support member over a top side of the battery, wherein the lid is disposed on the top side.

15. The battery module of claim 13, wherein the lid comprises the groove and the coupling member comprises the tongue extending from the cage and configured to align with the groove.

16. The battery module of claim 15, wherein the groove comprises a first recessed portion having a first depth extending into a surface of the lid and a second recessed portion having a second depth extending into the surface of the lid, wherein the first and second recessed portions are configured to engage the tongue, and the tongue has corresponding first and second protrusions configured to engage the first and second recessed portions.

17. The battery module of claim 13, wherein the lid comprises the groove positioned closer to a first end of the lid than a second end of the lid substantially opposite the first end, and the groove is configured to align the battery module in an orientation position when coupled with the tongue of the coupling mechanism.

18. The battery module of claim 13, wherein the tongue and groove configuration is configured to block installation of the battery module in all positions not corresponding to the installation orientation.

19. The battery module of claim 13, wherein footings extending from lateral sides of the battery module are excluded.

20. A battery module, comprising:
a housing configured to receive a plurality of lithium-ion electrochemical cells;
a lid coupled to a top of the housing;
a tray configured to receive the housing and configured to couple the housing to a frame component of a vehicle; and
a retention feature positioned on a top surface of the lid and configured to directly physically engage a mating feature with a corresponding geometry, wherein a geometry of the retention feature is such that engagement between the retention feature and the mating feature resists movement in at least three directions, wherein the mating feature is disposed on a support member of a cage, wherein the support member is configured to extend between a first side of the cage and a second side of the cage, and wherein the battery module is disposed between the first side and the second side.

21. The battery module of claim 20, comprising the mating feature, wherein the retention feature is a recessed portion configured to engage a protrusion of the mating feature.

22. The battery module of claim 20, comprising the mating feature, wherein the retention feature is a protrusion configured to engage a recessed portion of the mating feature.

23. The battery module of claim 20, wherein the housing comprises an additional retention feature.

24. The battery module of claim 20, wherein the housing does not include footings extending laterally from the housing and configured to couple the battery module to a structural support.

* * * * *